United States Patent [19]

Stowe et al.

[11] 4,363,533
[45] Dec. 14, 1982

[54] CONCENTRIC FIBER OPTICAL TRANSDUCER

[75] Inventors: David W. Stowe, Buffalo Grove, Ill.;
John D. Christian, deceased, late of
Warrenville, Ill.; by Albert Christian,
heir; by Martha R. Christian, heir,
both of Indianapolis, Ind.; by Ann L.
Ziegler, heir, Danville, Ind.; by
David A. Christian, heir,
Indianapolis, Ind.

[73] Assignee: Gould Inc., Rolling Meadows, Ill.

[21] Appl. No.: 106,763

[22] Filed: Dec. 26, 1979

[51] Int. Cl.³ .......................... G02B 5/172; G02F 1/00
[52] U.S. Cl. ............................... 350/96.33; 350/96.29;
350/358; 367/141
[58] Field of Search ............... 350/96.15, 96.16, 96.18,
350/96.29, 96.30, 96.31, 96.33, 355, 358;
340/850, 380; 367/140, 141, 169; 356/32, 44;
250/227

[56] References Cited

U.S. PATENT DOCUMENTS

| | | | |
|---|---|---|---|
| 3,408,131 | 10/1968 | Kapany | 350/96.29 |
| 3,831,137 | 8/1974 | Cuomo | 367/141 |
| 3,957,343 | 5/1976 | Dyott et al. | 350/96.29 |
| 4,000,416 | 12/1976 | Goell | 455/612 |
| 4,053,204 | 10/1977 | Miller | 350/96.31 |
| 4,053,205 | 10/1977 | Miller | 350/96.31 |
| 4,068,191 | 1/1978 | Zemon et al. | 331/94.5 M |
| 4,086,484 | 4/1978 | Steensma | 350/96.29 X |
| 4,149,772 | 4/1979 | Iyengar et al. | 350/96.33 |
| 4,151,747 | 5/1979 | Gottlieb et al. | 356/44 X |
| 4,162,397 | 7/1979 | Bucaro et al. | 350/96.29 X |

OTHER PUBLICATIONS

Smith, "Acoustically Operated Fiber Optic Switch", IBM Tech. Discl. Bulletin, vol. 14, No. 2, Jul. 1971, p. 652.
Gfeller et al., "Modulator and Tap for Optical Fiber Systems", IBM Tech. Discl. Bull., vol. 21, No. 5, Oct. 1978, pp. 2014-2015.
Macedo et al., "Optical Sensing Apparatus and Method", PCT Int'l. Pub. 79/00377, Jun. 28, 1979.

Primary Examiner—John D. Lee
Attorney, Agent, or Firm—K. H. Pierce; Harold Huberfeld; Edward E. Sachs

[57] ABSTRACT

An optical transducer (10) having a plurality of concentric cores (15,17). An intermediate cladding (16) is disposed between the inner and outer cores and an outer cladding (18) surrounds the outer core to define a symmetrical cylindrical transducer structure. Light propagated through the inner core (15) from a source (19) is coupled into the outer core (17) as a result of penetration of the evanescent electric field from the light in the inner core through the inner cladding (16) to the outer core. Control of the coupling length may be effected by suitable selection of the transducer structure parameters. At least one of the portions of the transducer is formed of an acousto-optically variable material whereby an acoustic field acting on the transducer causes a modulation of the coupled light so as to provide in the outer core (17) a modulated light signal suitable for detection by a receiver (21). Localized control of the parameters of the transducer may be effected to provide focusing of the coupled light. An electrical signal may be provided for controlling the coupling between the core portions.

25 Claims, 2 Drawing Figures

CONCENTRIC FIBER OPTICAL TRANSDUCER

DESCRIPTION

1. Technical Field

This invention relates to optical transducers and in particular to optical fiber transducers.

2. Background Art

In U.S. Pat. No. 4,000,416 of James E. Goell, a multi-core optical communications fiber is disclosed having concentric core portions, the outer one of which defines means for signaling an attempted access to the inner core fiber. The structure is designed to prevent tapping of light energy from the inner core fiber by unauthorized persons so as to avoid the need for encoding information data, etc., in order to preserve the system's security. The structure is arranged to prevent any intermixing between the signal carried on the inner core and the security signal carried on the outer tubular core. Rather, the attempted access to the inner core requires the intruder to pass through the outer core and thus effect the security signal being carried thereby so as to provide the desired alerting of the attempted intrusion. The structure is specifically designed so that the signal core and the alarm core are optically independent from each other and for this purpose, the cladding disposed intermediate the signal and alarm cores to caused to have a lower refractive index. Resultingly, the signal core and alarm core are optically independent from each other in the use of the optical communications fiber.

Another form of optical fiber waveguide is shown in U.S. Pat. No. 4,068,191 of Stanley A. Zemon et al. The waveguide therein is utilized in an optical communications system with an acoustic transducer and defines an acousto-optic modulator in which the light is modulated while propagating through the fiber. Acoustic waves generated in the optical fiber waveguide are focused inwardly to the center so that energy densities where acousto-optic modulation occurs are high so as to provide high acoustic driving power and modulation efficiency. The acoustic wave is generated so as to be focused into an axially adjacent portion to couple a portion of the light propagated within one of the guided modes into the other of the modes. The patentees teach that the waveguide has an index of refraction profile which confines light propagating through the waveguide to a portion of the waveguide which is adjacent to its axis.

In another form of acousto-optic underwater detector, Frank W. Cuomo shows, in U.S. Pat. No. 3,831,137, a low frequency or press-gradient hydrophone including an optical reflector experiencing displacement responsive to acoustic waves. A beam light from a light source carried by a first group of fiber optic guides is incident upon the reflector so that the light reflected is carried by a second group of fiber optic guides in the hydrophone to a light detector. The displacement of the reflector due to pressure gradients acting thereon, such as from acoustic waves impinging on the opposite sides of the reflector, are detected by changes in the intensity of the light delivered to the detector.

DISCLOSURE OF INVENTION

The present invention comprehends an improved optical transducer including an inner core, an intermediate cladding layer on the inner core, a tubular outer core, and an outer cladding layer about the outer core.

The indices of refraction are selected so as to permit a fraction of light propagated through the inner core to couple by means of its evanescent field into the outer core over a coupling length of the transducer determined by the index of refraction characteristics of the intermediate cladding. Reversely, light coupled into the outer core may evanescently couple back into the inner core where the length of the transducer is greater than the coupling length.

The invention comprehends that the coupling physically originate in the transducer by means of the evanescent electric field from light propagated in the inner core which actually penetrates through the intermediate cladding into the outer core to propagate light in the outer core.

The invention comprehends that two or more of the concentric fiber portions be differently optically variable so as to cause the difference in refractive index profiles of different portions of the transducer to vary as a function of incident physical effects such as produced by a sound field thereon. As the variation in the refractive index differences gives rise to a variation in the coupling length between the inner and outer cores, the coupling varies proportionately to the incident physical effect and, thus, the device may comprise an optical transducer providing an output signal corresponding to sound and/or pressure forces acting on the transducer as from the surrounding media. Resultingly, the transducer of the present invention is advantageously adapted for use as a hydrophone.

More specifically, the improved optical transducer of the present invention includes an inner optical fiber core, an inner optical cladding concentrically about the core formed of a material having a refractive index less than that of the inner core, an outer optical core concentrically about the inner cladding formed of a material having a refractive index greater than the refractive index of the inner cladding, and an outer optical cladding concentrically about the outer core formed of a material having a refractive index less than that of the outer core. In the illustrated embodiment, the materials comprising certain of the cores and cladding are differently variable suitably to cause a variation in the difference between the refractive indices of different concentric portions of the transducer as a result of stresses acting on the transducer.

The invention comprehends that the refractive index profile of at least one of the concentric portions of the transducer may vary along the length of the transducer and/or azimuthally thereof.

The invention comprehends that the radial dimension of the concentric portions of the transducer be similar.

Still further, the invention comprehends that the radial dimension of at least one of the concentric portions of the transducer vary longitudinally and/or azimuthally thereof.

Means may be provided for focusing light carried in the outer core at one portion thereof for facilitated transfer of the light therefrom as in readout of the modulated signal.

In the illustrated embodiment, the focusing means comprises an asymmetrical construction of at least one of the concentric portions of the transducer.

Illustratively, the radial dimension of the asymmetrical portion may vary azimuthally and/or the refractive index profile thereof may vary azimuthally.

The invention comprehends providing biasing means for controlling the optical coupling between the core portions of the transducer, and in the illustrated embodiment, the biasing means comprises means for providing an electrical signal to at least one of the concentric portions.

The optical transducer of the present invention is extremely simple and economical of construction while yet providing the highly improved functioning discussed above.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
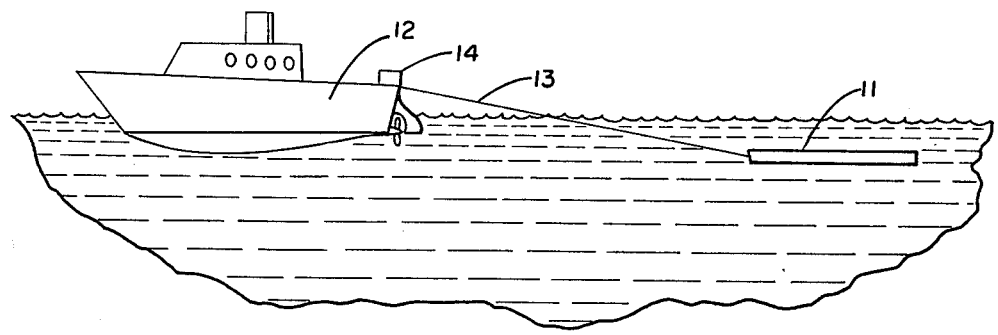
FIG. 1 is a view illustrating a hydrophonic use of an optical transducer embodying the invention.

In the exemplary embodiment of the invention as disclosed in the drawing, an optical transducer generally designated 10 is shown for use in a hydrophone 11, such as for use in detecting underwater sounds. As illustrated in FIG. 1, the hydrophone may be towed by a marine vessel 12 by suitable tow line 13, such as for geophysical exploration. Suitable apparatus 14 may be provided on the vessel for use with the hydrophone for providing information relative to the signal sensed by the hydrophone in use.

Figure 2:
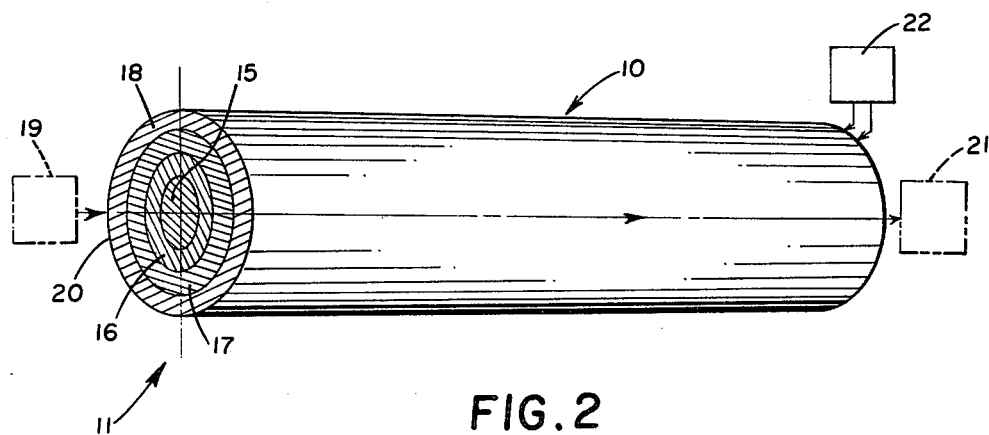
FIG. 2 is a perspective view of an optical transducer embodying the invention.

Referring now more specifically to FIG. 2 of the drawing, the optical fiber transducer 10 is shown to include a composite structure having, in cross section, four unique areas. More specifically, as shown, the transducer defines a cylindrical element having an axial, cylindrical, first core portion 15, a tubular, first cladding portion 16 surrounding the core, a tubular, second outer core portion 17, and a tubular outer cladding portion 18.

Core 15 receives light from a suitable source 19. The index of refraction of first cladding 16 is made to be less than the index of refraction of the core 15 and, thus, light propagates within the core.

The index of refraction of the outer core 17 is made to be greater than the index of refraction of cladding portion 16 and cladding portion 18. With such transducer construction, it has been found that a portion of the light propagated through the inner core 15 coupled into the outer core 17 as a result of the evanescent electric field from the propagated light in core 15 penetrating through the cladding 16 to the outer core 17 so as to cause propagation of light in the outer core. This coupling takes place over a characteristic coupling length $L_1$ measured along the fiber axis 20.

The coupling length is a function of the physical dimensions of the different portions of the transducer fiber, the refractive index profiles thereof, the dielectric constant of the intermediate cladding material, and the wavelength of the carrier light.

The invention comprehends that one or more of the different portions of the fiber be formed of photoelastic material, such as glass, such that the difference in the refractive index between the layers, or portions of the transducer, varies as a function of stress applied thereto. The variation in the dielectric constant of the cladding material for lightwaves of the frequencies of interest causes a variation in the coupling between the inner and outer cores and, thus, in effect, modulates the coupling so as to cause the light propagated in the outer core 17 to vary as a function of the incident stress. Resultingly, the modulated coupled light propagated from outer core 17 may be delivered to a detector/receiver generally designated 21 such as for transmission of the monitored signal to the readout apparatus 14. A substantial amount of light may be coupled to the outer core under conditions of no applied stress, such as 50% thereof, and thus, detector 21 may detect selectively the light in core 15 and/or the light in core 17. Thus, transducer 10, when utilized with suitable light source 19, and receiver 21 may constitute an improved hydrophone 11 wherein an applied stress such as from an acoustic field produces a modulated light signal for use in suitable monitoring apparatus.

As the cores 15 and 17 are concentric, a large cylindrical space is provided through which the evanescent wave coupling action may be effected. Thus, improved sensitivity to the applied field is obtained. Further, as a result of the concentric construction of the transducer portions, the radially symmetrical structure provides a low cost manufacture which may be effected in a substantially continuous process.

As will be obvious to those skilled in the art, suitable selection of refractive index profiles for the different portions of the transducer may be effected to obtain desired optical coupling characteristics of the transducer. As will be obvious to those skilled in the art, such differences in refractive index profiles may further be varied along the axis 20 of the transducer so as to form regions of different acousto-optic sensitivity. Similarly, the radial thickness of the different portions of the transducer may be varied along the axial extent of the transducer to provide regions of different acoustic sensitivity.

As will be further obvious to those skilled in the art, the relative thickness of the different transducer portions and/or the refractive index profiles thereof may be varied azimuthally. Such azimuthalvariation may be preselected to provide desired focusing of the light in the outer core portion 17 so as to permit coupling of the modulated light signal directly to a conventional optic fiber from the focused portion to a suitable receiver, such as a photo-detector.

The transducer may be advantageously constructed to have an extremely small cross-sectional outer diameter. Illustratively, such a transducer may be formed to have an outer diameter of several hundred microns or less.

The invention further comprehends the control of the coupling between the inner and outer core portions by introduction of an electrical signal to portions thereof.

Industrial Applicability

The optical transducer of the present invention may be utilized in a wide range of industrial applications. As indicated above, the transducer is advantageously adapted for use as a hydrophone transducer providing high sensitivity and reliability at low cost. Further, the transducer may be made symmetrical and of relatively small diameter so as to permit its use in a wide range of application wherein relative movement between the transducer and the surrounding fluid medium occurs.

As indicated above, the transducer may be utilized with electrical means for adjustably controlling the coupling between the core portions. As shown in FIG.

2, suitable apparatus 22 may be coupled to the desired core portion for effecting such control. More specifically, the transducer may have at least one of its components formed of an electro-optically variable material, such as lithium niobate, permitting the application of a voltage thereto to change the refractive index. Thus, the transducer may be utilized in a wide range of applications wherein selective sensitivity of the coupling characteristics is a desideratum.

As will be obvious to those skilled in the art, an initial mechanical bias may be provided to the transducer to effectively avoid rectification of the modulated output signal.

The foregoing disclosure of specific embodiments is illustrative of the broad inventive concepts comprehended by the invention.

What is claimed is:

1. An optical transducer comprising:
   an inner optical cylindrical fiber core;
   an inner optical cladding concentrically disposed about said core formed of a material having a refractive index less than that of said inner core;
   an outer optical core concentrically disposed about said inner cladding formed of a material having a refractive index greater than the refractive index of said inner cladding; and
   an outer optical cladding concentrically disposed about said outer core formed of a material having a refractive index less than that of said outer core, the materials comprising at least one of said core and cladding elements being differently optically responsive to cause a variation in the difference between the refractive indices of said elements as a result of an acoustic vibratory force acting on said transducer, said refractive indices and the configuration of the concentric cores and claddings being preselected to define means for effecting transfer of energy from one core to the other through variations in the extension of the evanescent electric field of the light propagated in said inner core outwardly through said inner cladding into said outer core.

2. The optical transducer of claim 1 wherein each of said concentric portions (16,17,18) has a substantially similar radial dimension.

3. The optical transducer of claim 1 wherein the refractive index profile of at least one of said concentric portions varies longitudinally of the transducer.

4. The optical transducer of claim 1 wherein the radial dimension of at least one of said concentric portions varies longitudinally of the transducer.

5. The optical transducer of claim 1 wherein the refractive index profile of at least one of said concentric portions varies azimuthally of the transducer.

6. The optical transducer of claim 1 wherein the radial dimension of at least one of said concentric portions varies azimuthally of the transducer.

7. The optical transducer of claim 1, wherein said inner optical cylindrical fiber core is a solid cylinder.

8. An optical transducer comprising:
   an inner optical fiber core;
   an inner optical cladding concentrically disposed about said core formed of a material having a refractive index less than that of said inner core;
   an outer optical core concentrically disposed about said inner cladding formed of a material having a refractive index greater than the refractive index of said inner cladding; and
   an outer optical cladding concentrically disposed about said outer core formed of a material having a refractive index less than that of said outer core, the materials comprising at least two of said core and cladding elements being differently optically variable to cause a variation in the difference between the refractive indices of said elements as a result of a physical effect acting on said transducer, said refractive indices and the configuration of the concentric cores and claddings being preselected to define means for effecting transfer of energy from one core to the other through variations in the extension of the evanescent electric field of the light propagated in said inner core outwardly through said inner cladding into said outer core, the arrangement of the transducer portions defining focusing means for focusing light carried in a portion of said outer core for facilitated transfer therefrom wherein said focusing means includes an asymmetrical construction of at least one of said concentric portions.

9. The optical transducer of claim 8 wherein the radial dimension of said asymmetrical construction of at least one of said concentric portions varies azimuthally.

10. The optical transducer of claim 8 wherein said asymmetrical construction of at least one of said concentric portions has a refractive index profile thereof which varies azimuthally.

11. The optical transducer of claim 8 wherein at least one of said outer concentric portions has an asymmetrical construction.

12. The optical transducer of claim 8 wherein said asymmetrical construction includes at least one of said outer concentric portions having a radial dimension which varies azimuthally.

13. The optical transducer of claim 8 wherein said asymmetrical construction includes at least one of said outer concentric portions having a refractive index profile which varies azimuthally.

14. An optical transducer comprising:
   an inner optical fiber core;
   an inner optical cladding concentrically disposed about said core formed of a material having a refractive index less than that of said inner core;
   an outer optical core concentrically disposed about said inner cladding formed of a material having a refractive index greater than the refractive index of said inner cladding; and
   an outer optical cladding concentrically disposed about said outer core formed of a material having a refractive index less than that of said outer core, the material comprising said inner cladding having a variable dielectric constant for the frequency of light to be propagated through said inner fiber core to cause a variation in the evanescent coupling of light from said inner fiber core to said outer core as a result of a physical effect acting on said transducer, said refractive indices and the configuration of the concentric cores and claddings being preselected to define means for effecting transfer of energy from one core to the other through variations in the extension of the evanescent electric field of the light propagated in said inner core outwardly through said inner cladding into said outer core, the arrangement of the transducer portions defining focusing means for focusing light carried in a portion of said outer core for facilitated transfer therefrom, the arrangement including an asymmetrical construction of at least one of said concentric portions.

15. The optical transducer of claim 14 wherein electrical control means (22) are provided for adjustably controlling the coupling between cores.

16. The optical transducer of claim 14 wherein said refractive indices are selected to cause approximately 50% of the light to couple evanescently from said inner core to said outer core in the absence of variable stresses applied to the transducer.

17. The optical transducer of claim 14 wherein the refractive index profile of at least one of said concentric portions varies longitudinally of the transducer.

18. The optical transducer of claim 14 wherein the radial dimension of at least one of said concentric portions varies longitudinally of the transducer.

19. The optical transducer of claim 14 wherein the refractive index profile of at least one of said concentric portions varies azimuthally of the transducer.

20. The optical transducer of claim 14 wherein the radial dimension of at least one of said concentric portions varies azimuthally of the transducer.

21. The optical transducer of claim 14 wherein said asymmetrical construction includes at least one of said concentric portions having a radial dimension which varies azimuthally.

22. The optical transducer of claim 14 wherein said asymetrical construction includes at least one of said concentric portions having a refractive index profile which varies azimuthally.

23. The optical transducer of claim 14 wherein said asymmetrical construction includes at least one of said outer concentric portions.

24. The optical transducer of claim 14 wherein said asymmetrical construction includes at least one of said outer concentric portions having a radial dimension which varies azimuthally.

25. The optical transducer of claim 14 wherein said asymmetrical construction includes at least one of said outer concentric portions having a refractive index profile which varies azimuthally.

* * * * *

UNITED STATES PATENT AND TRADEMARK OFFICE
CERTIFICATE OF CORRECTION

PATENT NO. : 4,363,533
DATED : December 14, 1982
INVENTOR(S) : David W. Stowe and John D. Christian, deceased It is certified that error appears in the above-identified patent and that said Letters Patent are hereby corrected as shown below:

In column 1, line 28, "to", first occurrence, to read -- is --.

In column 1, line 54, please change "press" to --pressure--; and

In column 4, line 41, please put a space inbetween "azimuthal" and "variation".

In column 8, line 9, please change "asymetrical" to --asymmetrical--.

Signed and Sealed this

First Day of March 1983

[SEAL]

Attest:

GERALD J. MOSSINGHOFF

Attesting Officer    Commissioner of Patents and Trademarks